June 25, 1957 J. M. HEGARTY 2,797,389
PULSE MODULATION CIRCUITS OR THE LIKE
Filed March 9, 1955
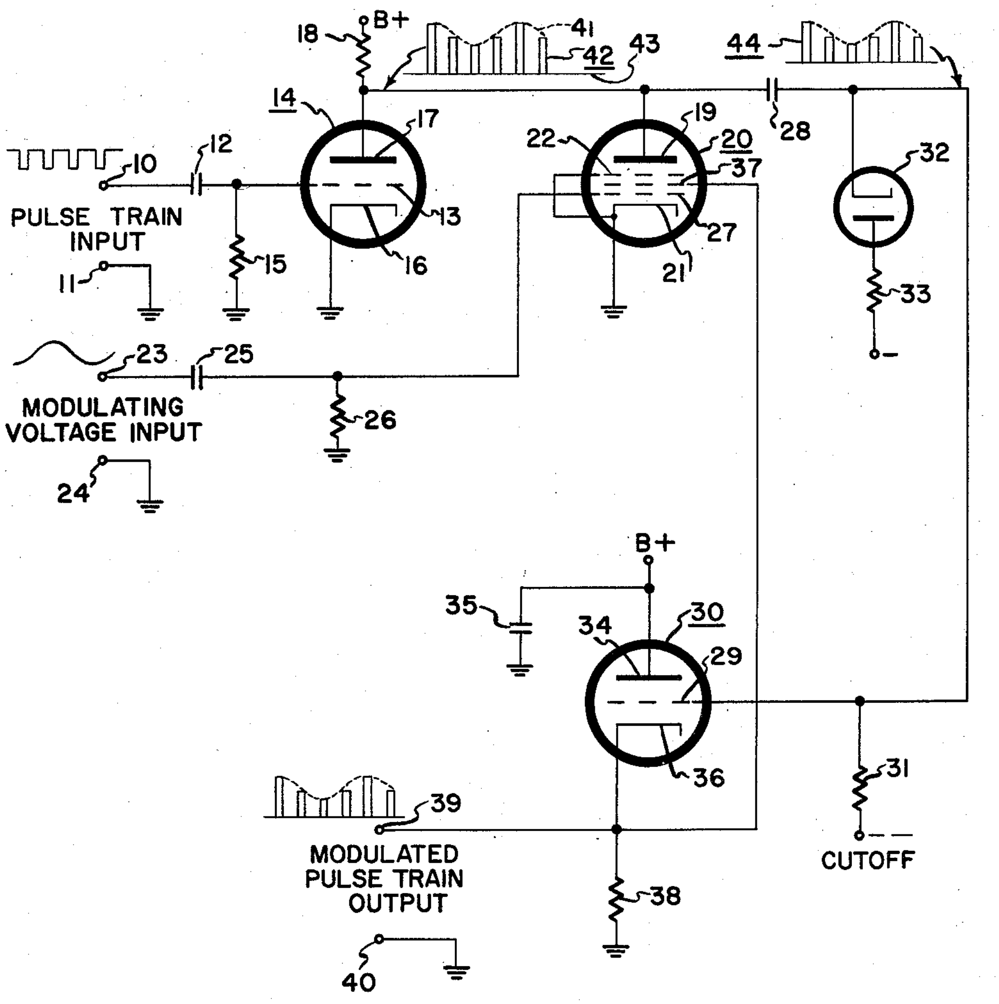
JAMES M. HEGARTY
*INVENTOR.*
BY *Bruce L. Birchard*
HIS ATTORNEY

United States Patent Office 2,797,389

Patented June 25, 1957

2,797,389

PULSE MODULATION CIRCUITS OR THE LIKE

James M. Hegarty, Alhambra, Calif., assignor to Hoffman Electronics Corporation, a corporation of California Application March 9, 1955, Serial No. 493,151

4 Claims. (Cl. 332—9)

This invention is related to pulse modulation circuits and, more particularly, to an improved pulse modulation circuit which will provide a modulated pulse carrier having a uniform base reference level.

Pulse modulation circuits in the past have been deficient in some respects. The chief complaint is directed towards the difficulty encountered in attempts to provide a modulated pulse carrier having a constant and uniform pulse-train base reference level. Heretofore, the modulating voltage employed itself has deleterious effects upon the wave shape of the final modulated pulse-train wave form.

Therefore, it is an object of the present invention to provide a new and useful pulse modulation circuit.

It is a further object of the present invention to provide a new and useful pulse-train modulation circuit which will exhibit an output modulated pulse-train having a constant base reference level.

According to the present invention, a pulse amplifier is anode modulated by the output modulating signal from a multi-grid vacuum tube and feeds into a cathode follower the output from which is fed to the screen electrode of the aforementioned multi-grid vacuum tube so that multi-grid tube conduction will be permitted only during pulse intervals. During the time intervals between pulses the absence of multi-grid tube current allows the base line of the output signal from the pulse amplifier to remain unaffected by modulating voltage swings.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing in which:

The sole figure is a schematic diagram of a pulse modulator circuit according to the present invention.

In the sole figure input terminals 10 and 11 are adapted for coupling to a pulse-train signal source. Input terminal 10 is coupled through capacitor 12 to control electrode 13 of vacuum tube 14 and also to ground through resistor 15. Cathode 16 of vacuum tube 14 is maintained at ground potential. Anode 17 is coupled through anode load resistor 18 to a source of positive voltage (B+). Anode 17 of vacuum tube 14 is also directly connected to anode 19 of multi-grid vacuum tube 20. Cathode 21 of vacuum tube 20 is directly connected to suppressor electrode 22 and also to ground. Input terminals 23 and 24 are adapted for coupling to a signal source of modulating voltage. Input terminal 23 is coupled through capacitor 25 to ground through resistor 26 and also to control electrode 27 of vacuum tube 20. Input terminal 24 is maintained at ground potential. Anode 19 of vacuum tube 20 is coupled through capacitor 28 to control electrode 29 of vacuum tube 30, through resistor 31 to a source of negative cut-off voltage, and through a direct current resistor circuit comprising diode 32 and current limiting resistor 33 to a source of negative voltage. (Neither negative voltage sources are shown in the sole figure.) Anode 34 of vacuum tube 30 is connected to a source of positive voltage (B+) and also to R-F ground through bypass capacitor 35. Cathode 36 of vacuum tube 30 is directly connected to screen electrode 37 of vacuum tube 20, to ground through cathode load resistor 38, and to modulated pulse-train output terminal 39. Output terminal 40 is maintained at ground potential.

The circuit shown in the sole figure operates as follows. The negative pulse-train input signal is coupled through input coupling capacitor 12 to control electrode 13 of pulse amplifier tube 14. The negative pulses of the input pulse-train signal each cut off vacuum tube 14 during its respective duration to produce an output pulse-train of positive pulses, the positive pulse threshold being at B+ voltage. The modulating voltage input signal is coupled through capacitor 25 to control electrode 27 of vacuum tube 20. The amplitude and frequency of the modulating voltage input signal of course determines the character of envelope 41, of modulated pulse-train 42. During conduction intervals of vacuum tube 14, vacuum tube 20 will also be in a state of conduction, unless prevented from so doing. Furthermore, such conduction of vacuum tube 20 would prevent modulated pulse-train 42 from having a constant base reference level 43, but rather the base reference level would be undulating. This undesirable undulating of base reference level 43, of modulated pulse-train 42, is prevented as follows. Modulated pulse-train 42 is fed through coupling capacitor 28 to control electrode 29 of cathode follower tube 30. A modulated pulse-train signal in phase with modulated pulse train 42 is taken from cathode load resistor 38 of cathode follower tube 30 and fed to modulated pulse-train output terminals 39 and 40. This same modulated pulse-train signal from cathode load resistor 38 is also fed back to screen electrode 37 of multi-grid vacuum tube 20. It is recalled that this signal which is fed back to screen electrode 37 is in phase with modulated pulse-train 42 appearing at anode 19 of vacuum tube 20 so that, during time intervals between pulses, screen electrode 37 is maintained at ground potential thereby reducing to a negligible amount tube current of vacuum tube 20. Absence of vacuum tube 20 current through anode load resistor 18 stabilizes base reference level 43 of modulated pulse-train 42 to a constant value. During the occurrences of modulated pulses at anode 19 of vacuum tube 20, modulated pulses will also appear at screen electrode 37, thereby permitting tube conduction of vacuum tube 20 during these time intervals. Variations in pulse amplitude appearing at screen electrode 37 are desirous, rather than being objectionable, since this slight negative feed-back, in effect, will lend stability to the circuit.

It might be thought in the first instance, that the feature of this invention in directly coupling screen grid 37 with cathode 36 might be avoided by choosing a proper operating point for the direct current restorer composed of diode 32 and resistor 33. However, the fact is that in order to remove the undulations in base line 43 of modulated pulse-train 42, the operating point of the direct current restorer would have to be so large negatively as to prevent a sizeable signal from being impressed upon control electrode 29 of vacuum tube 30. Much more flexibility of circuit operation is obtained by the present circuit, with the inclusion of the direct coupling of screen electrode 37 with cathode 36 of vacuum tube 30 in order for base line undulation to be eliminated at the outset, i. e., by preventing the conduction of vacuum tube 20 during time intervals between pulses. Hence, the peak amplitude of pulse-train 44 may remain as high as is required for the proper operation and output signal of cathode follower 30.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A pulse modulation circuit including, in combination, a pulse amplifier having an input circuit and an output circuit; a multi-grid vacuum tube having an input circuit, an output circuit common with said output circuit of said pulse amplifier, and an intermediate grid electrode; and a cathode follower having an input circuit coupled to said output circuit common to said pulse amplifier and said multi-grid vacuum tube and an output circuit coupled to said intermediate electrode of said multi-grid vacuum tube.

2. Apparatus according to claim 1 in which a direct current restorer circuit shunts said input circuit of said cathode follower.

3. A pulse modulation circuit including, in combination, a first vacuum tube having a cathode maintained at a common reference potential, a control electrode adapted for coupling to a pulse source, and an anode; a load resistor coupled between said anode of said first vacuum tube and a source of high voltage which is positive with respect to said common reference potential; a second vacuum tube having a cathode maintained at said common reference potential, a control electrode adapted for coupling to a source of modulating voltage, a screen electrode, a suppressor electrode directly connected to said cathode, and an anode directly connected to the junction of said anode of said first vacuum tube and said load resistor; a third vacuum tube having a cathode directly connected to said screen electrode of said second vacuum tube, a control electrode, and an anode directly connected to said source of said positive voltage; a load resistor coupled between said cathode of said third vacuum tube and said common reference potential; an input resistor coupled between said control electrode of said third vacuum tube and a source of voltage which is negative with respect to said common reference potential; a capacitor coupled between said control electrode of said third vacuum tube and the junction of said anodes of said first and second vacuum tubes and said anode load resistor; and an output terminal coupled to the junction of said cathode of said third vacuum tube and said cathode load resistor and also to said screen electrode of said second vacuum tube.

4. Apparatus according to claim 3 in which a direct current restorer circuit shunts said input resistor coupled to said control electrode of said third vacuum tube.

References Cited in the file of this patent

UNITED STATES PATENTS 2,711,513 Baer ------------------ June 21, 1955